United States Patent
Agashe et al.

(10) Patent No.: US 10,259,995 B2
(45) Date of Patent: Apr. 16, 2019

(54) HYDROPHOBICALLY MODIFIED QUATERNIZED POLYSACCHARIDE CORROSION INHIBITORS

(71) Applicant: HALLIBURTON ENERGY SERVICES, INC., Houston, TX (US)

(72) Inventors: Snehalata Sachin Agashe, Maharashtra (IN); Sushant Dattaram Wadekar, Maharashtra (IN); Ranjeet Gangadhar Kshirsagar, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/539,064

(22) PCT Filed: Feb. 6, 2015

(86) PCT No.: PCT/US2015/014745
§ 371 (c)(1),
(2) Date: Jun. 22, 2017

(87) PCT Pub. No.: WO2016/126259
PCT Pub. Date: Aug. 11, 2016

(65) Prior Publication Data
US 2017/0349820 A1    Dec. 7, 2017

(51) Int. Cl.
  *C09K 8/90* (2006.01)
  *C09K 8/54* (2006.01)
  *E21B 41/02* (2006.01)

(52) U.S. Cl.
  CPC .......... *C09K 8/90* (2013.01); *C09K 8/54* (2013.01); *E21B 41/02* (2013.01); *C09K 2208/32* (2013.01)

(58) Field of Classification Search
  None
  See application file for complete search history.

(56) References Cited

U.S. PATENT DOCUMENTS

| 8,404,157 B2 | 3/2013 | Cassidy et al. |
| 2006/0234872 A1 | 10/2006 | Mirakyan et al. |
| 2007/0215355 A1 | 9/2007 | Shapovalov et al. |
| 2011/0256085 A1* | 10/2011 | Talingting Pabalan ..... A61K 8/042 424/70.13 |
| 2014/0200168 A1* | 7/2014 | Misra ..... C09K 8/035 507/110 |
| 2014/0338902 A1 | 11/2014 | Mukhopadhyay et al. |

FOREIGN PATENT DOCUMENTS

| WO | WO-2005054544 A1 | 6/2005 |
| WO | WO-2014109820 A1 | 7/2014 |
| WO | WO-2014110110 A1 | 7/2014 |
| WO | WO-2016/126259 A1 | 8/2016 |

OTHER PUBLICATIONS

International Search Report and Written Opinion from PCT/US2015/014745, dated Aug. 28, 2015.

* cited by examiner

*Primary Examiner* — Jeffrey D Washville
(74) *Attorney, Agent, or Firm* — Thomas Rooney; C. Tumey Law Group PLLC

(57) ABSTRACT

A treatment fluid that includes an aqueous fluid, an inorganic acid, and a hydrophobically modified quaternized polysaccharide may be useful in mitigating corrosion of metal surfaces by the inorganic acid. For example, a wellbore operation may include introducing the treatment fluid into a wellbore penetrating a subterranean formation and contacting a metal surface with a treatment fluid.

10 Claims, 1 Drawing Sheet

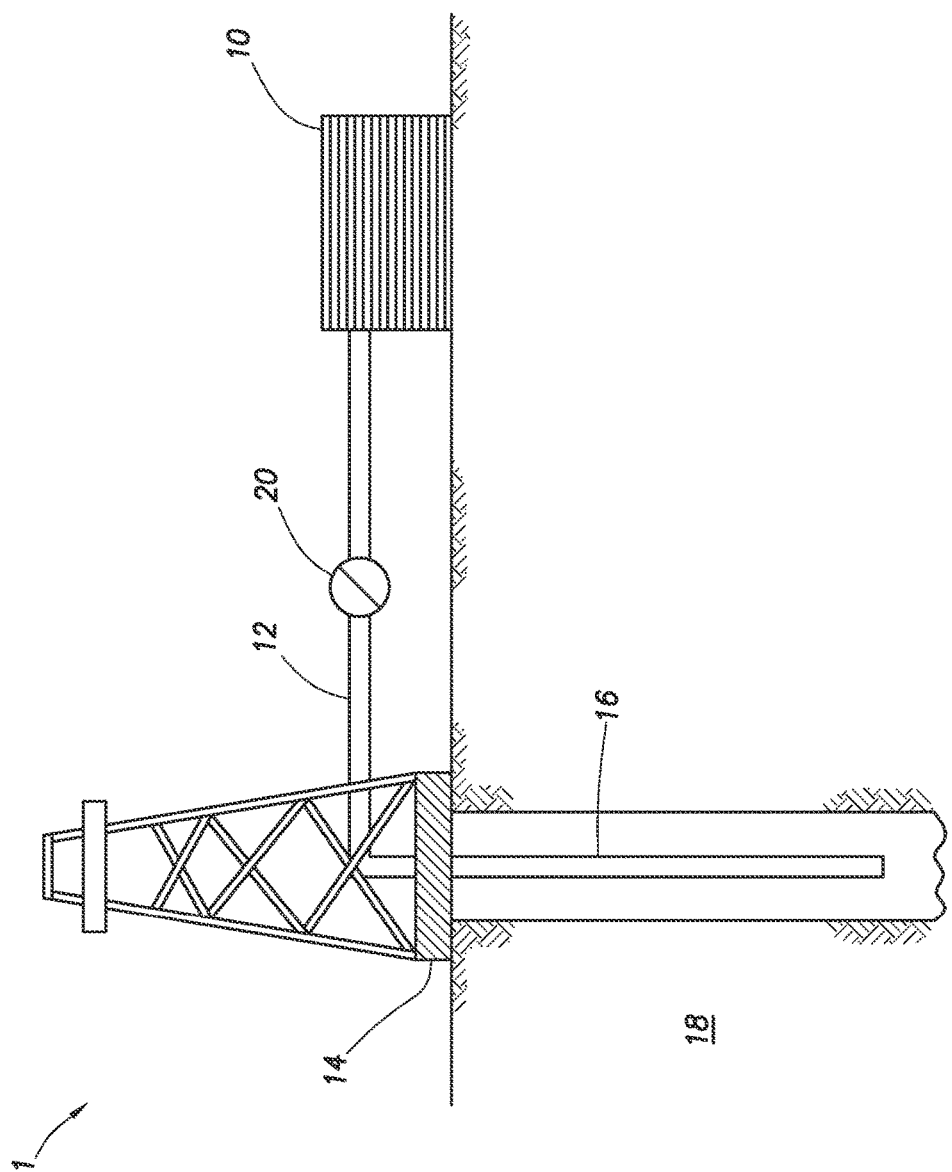

HYDROPHOBICALLY MODIFIED QUATERNIZED POLYSACCHARIDE CORROSION INHIBITORS

BACKGROUND

The embodiments described herein relate to corrosion inhibitors.

Acidizing and fracturing operations using aqueous acidic solutions commonly are carried out in hydrocarbon-containing subterranean formations penetrated by a wellbore to accomplish a number of purposes, one of which is to increase the permeability of the formation. Increasing the formation permeability often increases the recovery of hydrocarbons from the formation in subsequent production operations.

A problem associated with acidizing subterranean formations is the corrosion by the acidic solution of metal surfaces (e.g., tubulars in the wellbore). The expense of repairing or replacing corrosion damaged equipment can be extremely high. The corrosion problem may be exacerbated by the elevated temperatures encountered in deeper formations. Further, the increased corrosion rate of the ferrous and other metals comprising the tubular goods and other equipment results in quantities of the acidic solution being neutralized before it ever enters the subterranean formation. In some instances, the partial neutralization of the acid can produce quantities of metal ions that are highly undesirable in the subterranean formation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 provides an illustrative schematic of a system that can deliver treatment fluids described herein to a downhole location, according to one or more embodiments.

DETAILED DESCRIPTION

The embodiments described herein relate to hydrophobically modified quaternized polysaccharide corrosion inhibitors that are suitable for use in acidizing and fracture acidizing operations downhole. Advantageously, the hydrophobically modified quaternized polysaccharides are polysaccharide-based, which, in some instances, may enhance the environmental compatibility of the treatment fluid used in the downhole operations.

Hydrophobically modified quaternized polysaccharides may be included in a treatment fluid with acids to mitigate the corrosion of metal surfaces that are contacted by the treatment fluid. In some instances, corrosion inhibitor intensifiers may also be included to further reduce corrosion of the metal surfaces or extend the performance range of the hydrophobically modified quaternized polysaccharide corrosion inhibitor.

As used herein, the term "hydrophobically modified quaternized polysaccharide" refers to a polysaccharide backbone with two pendant moieties: a long chain hydrocarbon moiety and a quaternary ammonium-containing moiety.

The hydrocarbon moieties may be $C_6$ to $C_{32}$ alkyl groups bonded to the polysaccharide backbone by an ether bond. As used herein, the term "alkyl" encompasses carbon/hydrogen moieties that may be saturated or unsaturated, linear or branched, and optionally include a cyclic or aromatic component.

In some embodiments, derivatization of the polysaccharide backbone may be achieved by reacting the backbone with hydrocarbon moieties containing halides, halohydrins, and epoxides.

The quaternary ammonium-containing moieties may be any moiety with a quaternary ammonium group. The quaternary ammonium group includes four alkyl groups. For example, the ammonium group may include two methyl groups, one $C_6$ to $C_{32}$ alkyl group and one polyhydroxy alkyl group linked to polysaccharide backbone. Examples of quaternary ammonium-containing moieties may include, but are not limited to, propanamonium, N-cocoalkyl-N,N dimethyl, 2,3 dihydroxy; propanamonium, N-cocoalkyl-N,N diethyl, 2,3 dihydroxy; propanamonium, N-cocoalkyl-N,N dipropyl2,3 dihydroxy; propanamonium, N-cocoalkyl-N-methyl,N-ethyl2,3 dihydroxy; propanamonium, N-cocoalkyl-N-methyl,N-propyl2,3 dihydroxy; propanamonium, N-cocoalkyl-N-ethyl,N-propyl2,3 dihydroxy; propanamonium, N-soyalkyl-N,N dimethyl, 2,3 dihydroxy; propanamonium, N-soyalkyl-N,N diethyl, 2,3 dihydroxy; propanamonium, N-soyalkyl-N,N dipropyl2,3 dihydroxy; propanamonium, N-soyalkyl-N-methyl,N-ethyl2,3 dihydroxy; propanamonium, N-soyalkyl-N-methyl,N-propyl2,3 dihydroxy; propanamonium, N-soyalkyl-N-ethyl,N-propyl2,3 dihydroxy; ethanamonium, N-cocoalkyl-N,N diethyl 2 hydroxy; ethanamonium, N-cocoalkyl-N,N dimethyl 2 hydroxy; ethanamonium, N-cocoalkyl-N-methyl, N-ethyl 2 hydroxy; ethanamonium, N-cocoalkyl-N-methyl, N-propyl 2 hydroxy; ethanamonium, N-cocoalkyl-N-ethyl, N-propyl 2 hydroxy; ethanamonium, N-soyalkyl-N,N diethyl 2 hydroxy; ethanamonium, N-soyalkyl-N,N dimethyl 2 hydroxy; ethanamonium, N-soyalkyl-N-methyl, N-ethyl 2 hydroxy; ethanamonium, N-soyalkyl-N-methyl, N-propyl 2 hydroxy; ethanamonium, N-soyalkyl-N-ethyl, N-propyl 2 hydroxy; and the like.

In some embodiments, derivatization of the polysaccharide backbone may be achieved by reacting the backbone with quaternary ammonium-containing moieties containing halides, halohydrins, and epoxides.

Examples of polysaccharide backbone may include, but are not limited to, cellulose, hydroxyethyl cellulose, hydroxypropyl cellulose, carboxymethyl cellulose, starch, glycogen, chitin, gum guar, hydroxyethyl guar gum, hydroxypropyl guar (HPG), carboxymethyl hydroxypropyl guar (CMHPG), carrageenans, lignin, scleroglucan, and the like.

Specific examples of hydrophobically modified quaternized polysaccharides may include, but are not limited to, Formula I where $R_1$ and $R_2$ may independently be $C_6$ to $C_{32}$ alkyl groups and Formula 2 where $R_1$ and $R_2$ may independently be $C_6$ to $C_{32}$ alkyl groups.

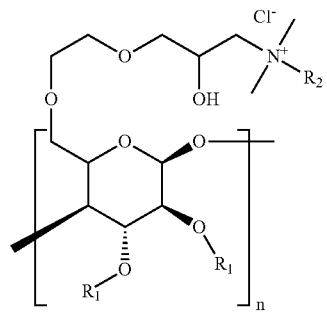

Formula 1

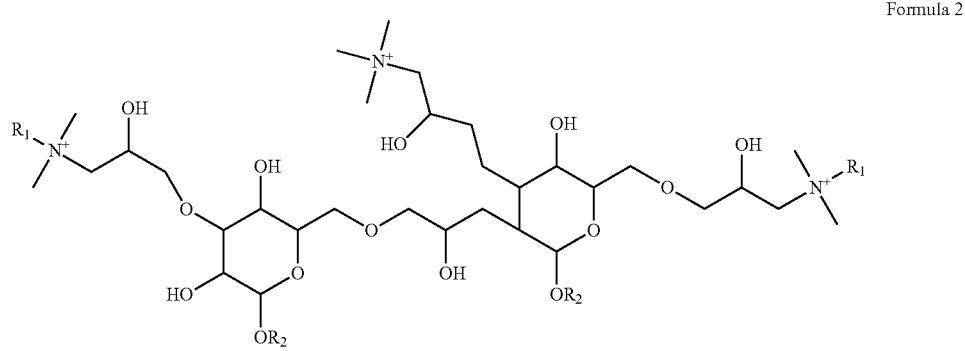

Formula 2

The hydrophobically modified quaternized polysaccharides may present in an amount effective to inhibit corrosion by the acid on the metal surfaces to be protected. In some embodiments, the hydrophobically modified quaternized polysaccharides may be present in an amount of about 0.05% to about 20% by weight of the treatment fluid.

Examples of corrosion inhibitor intensifiers may include, but are not limited to, formic acid, potassium iodide, cuprous iodide, antimony-based intensifiers, phosphorous-based intensifiers (e.g., triphenylphosphine, triethylphosphine, and trimethylphosphine), and the like, and any combination thereof.

In some embodiments, the corrosion inhibitor intensifiers may be present in an amount of about 0.005% to about 40% by weight of the treatment fluid.

The acid in the treatment fluid may include, but is not limited to, hydrochloric acid, hydrofluoric acid, hydrobromic acid, sulfuric acid, and the like. Blends of the foregoing acids may also be included in the treatment fluid.

In some embodiments, the acid may be present in an amount of about 1% to 34% by weight of the treatment fluid. The amount of the acid(s) included in a particular treatment fluid formulation may depend upon the particular acid used, as well as other components of the treatment fluid, and/or other factors that will be recognized by one of ordinary skill in the art with the benefit of this disclosure (e.g., the lithology of the subterranean formation).

The aqueous fluids used in the treatment fluids described herein may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids. One of ordinary skill in the art, with the benefit of this disclosure, will recognize what components might adversely affect the stability and/or performance of the treatment fluids or components thereof.

In some embodiments, the treatment fluids described herein optionally may further include one or more of a variety of additives (e.g., gel stabilizers, salts, fluid loss control additives, surfactants, solvents, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like, and any combination thereof). Those of ordinary skill in the art, with the benefit of this disclosure, will be able to determine the appropriate additives and respective concentrations for a particular application.

The treatment fluids described herein (i.e., comprising an aqueous fluid, one or more acid, and one or more hydrophobically modified quaternized polysaccharides and optionally further including one or more corrosion inhibitor intensifiers, one or more additives, or both) may be useful in acidizing and/or fracture acidizing treatments of subterranean formations.

In acidizing operations, a treatment fluid described herein may be introduced into a wellbore penetrating a subterranean formation at a pressure below the fracture pressure of the formation. The fracture pressure is the pressure at or above which the formation hydraulically fractures. The fracture pressure is also sometimes described as a pressure sufficient to create or extend at least one fracture in the formation. Determination of the fracture pressure of a formation is known to those skilled in the art.

After introduction of the treatment fluid into the formation, the treatment fluid may flow into the formation via pore spaces and naturally occurring fractures in the formation. The acid may then react with the) near-wellbore (NWB) region of the formation (e.g., acid soluble portion of the formation to create flow channels for hydrocarbons to flow from reservoir to wellbore and increase the pore sizes, which leads to increased permeability through the formation.

In fracture acidizing operations, a treatment fluid described herein may be introduced into a wellbore penetrating a subterranean formation at a pressure at or above the fracture pressure of the formation (i.e., at a pressure sufficient to create or extend at least one fracture in the formation). The treatment fluid may then flow into the fractures (natural and man-made) and pore spaces of the formation. Like the acidizing operation, the acid may then react with the formation to etch flow channels in the fracture faces and increase the pore sizes, which leads to increased permeability through the formation.

During both acidizing and fracture acidizing operations, the hydrophobically modified quaternized polysaccharides may interact with (e.g., adsorb to) metal surfaces contacted by the treatment fluid and mitigate corrosion of the metal surfaces. Without being limited by theory, it is believed that the positively charged quaternary ammonium-containing moieties associate with negative charge on the metal surface. The hydrocarbon moieties then orient away from the metal surface, thereby reducing the hydrophilicity of the surface, which reduces the interaction between the acid and the metal surface. This reduced interaction mitigates acid corrosion of the metal surface.

Examples equipment and tools that have metal surfaces that could be exposed to the treatment fluid during an acidizing or fracture acidizing operation may include, but are not limited to, pumps, liners, sliding sleeves, tubulars, pipes, valves, and the like.

In various embodiments, systems may be configured for delivering the treatment fluids described herein to a downhole location. In various embodiments, the systems can comprise a pump fluidly coupled to a tubular, the tubular containing a treatment fluid comprising an aqueous fluid, one or more acid, and one or more hydrophobically modified quaternized polysaccharides and optionally further including one or more corrosion inhibitor intensifiers, one or more additives, or both.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 provides an illustrative schematic of a system that can deliver treatment fluids described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid described herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:
A. a treatment fluid that includes an aqueous fluid, an inorganic acid, and a hydrophobically modified quaternized polysaccharide;
B. a method that includes contacting a metal surface with a treatment fluid that comprises an aqueous fluid, an inorganic acid, and a hydrophobically modified quaternized polysaccharide, wherein the hydrophobically modified quaternized polysaccharide mitigates corrosion of the metal surface by the inorganic acid; and
C. a wellhead with a tubular extending therefrom and into a wellbore in a subterranean formation, the tubular having disposed therein a treatment fluid that comprises an aqueous fluid, an inorganic acid, and a hydrophobically modified quaternized polysaccharide; and a pump fluidly coupled to the tubular, wherein the tubular, the pump, or both have a metal surface in contact with the treatment fluid, and wherein the hydrophobically modified quaternized polysaccharide mitigates corrosion of the metal surface by the inorganic acid.

Each of Embodiments A, B, and C may have one or more of the following additional elements in any combination: Element 1: wherein the hydrophobically modified quaternized polysaccharide has a polysaccharide backbone with two pendant moieties: a hydrocarbon moiety and a quaternary ammonium-containing moiety, wherein the hydrocarbon moiety is a $C_6$-$C_{32}$ alkyl group; Element 2: Element 1 wherein the quaternary ammonium-containing moiety is selected from the group consisting of propanamonium, N-cocoalkyl-N,N dimethyl, 2,3 dihydroxy; propanamonium, N-cocoalkyl-N,N diethyl, 2,3 dihydroxy; propanamonium, N-cocoalkyl-N,N dipropyl2,3 dihydroxy; propanamonium, N-cocoalkyl-N-methyl,N-ethyl2,3 dihydroxy; propanamonium, N-cocoalkyl-N-methyl,N-propyl2,3 dihydroxy; propanamonium, N-cocoalkyl-N-ethyl,N-propyl2,3 dihydroxy; propanamonium, N-soyalkyl-N,N dimethyl, 2,3 dihydroxy; propanamonium, N-soyalkyl-N,N diethyl, 2,3 dihydroxy; propanamonium, N-soyalkyl-N,N dipropyl2,3 dihydroxy; propanamonium, N-soyalkyl-N-methyl,N-ethyl2,3 dihydroxy; propanamonium, N-soyalkyl-N-methyl, N-propyl2,3 dihydroxy; propanamonium, N-soyalkyl-N-ethyl,N-propyl2,3 dihydroxy; ethanamonium, N-cocoalkyl-N,N diethyl 2 hydroxy; ethanamonium, N-cocoalkyl-N,N dimethyl 2 hydroxy; ethanamonium, N-cocoalkyl-N-methyl, N-ethyl 2 hydroxy; ethanamonium, N-cocoalkyl-N-methyl, N-propyl 2 hydroxy; ethanamonium, N-cocoalkyl-N-ethyl, N-propyl 2 hydroxy; ethanamonium, N-soyalkyl-N,N diethyl 2 hydroxy; ethanamonium, N-soyalkyl-N,N dimethyl 2 hydroxy; ethanamonium, N-soyalkyl-N-methyl, N-ethyl 2 hydroxy; ethanamonium, N-soyalkyl-N-methyl, N-propyl 2 hydroxy; and ethanamonium, N-soyalkyl-N-ethyl, N-propyl 2 hydroxy; Element 3: wherein the hydrophobically modified quaternized polysaccharide is Formula 1 where R1 is a $C_6$-$C_{32}$ alkyl group and R2 is a $C_6$-$C_{32}$ alkyl group; Element 4: wherein the hydrophobically modified quaternized polysaccharide is Formula 2 where R1 is a $C_6$-$C_{32}$ alkyl group and R2 is a $C_6$-$C_{32}$ alkyl group; Element 5: wherein the inorganic acid is at about 1% to about 34% by weight of the treatment fluid; Element 6: wherein the hydrophobically modified quaternized polysaccharide is at about 0.05% to about 20% by weight of the treatment fluid; Element 7: wherein the treatment fluid further comprises a corrosion inhibitor intensifier; Element 8: Element 7 wherein the corrosion inhibitor intensifier is at about 0.005% to about 40% by weight of the treatment fluid.

By way of non-limiting example, exemplary combinations applicable to Embodiments A, B, C include: Element 1 and optionally Element 2 in combination with one or more of Elements 5-8; one or both of Elements 3-4 in combination with one or more of Elements 5-8; Element 1 and optionally Element 2 in combination with one or both of Elements 3-4; and one or more of Elements 5-8 in combination.

Further, Embodiment B may have one or more of the following additional elements in any combination optionally in combination with one or more of Elements 1-8 (including the foregoing combinations): Element 9: the method further including introducing the treatment fluid into a wellbore penetrating a subterranean formation at or below a fracture pressure of the subterranean formation; and Element 10: the method further including introducing the treatment fluid into a wellbore penetrating a subterranean formation above a fracture pressure of the subterranean formation, thereby creating or extending at least one fracture in the subterranean formation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments described herein, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the embodiments described herein, the following examples of preferred or representative embodiments are given. In no way should the following examples be read to limit, or to define, the scope of the invention.

EXAMPLES

To test corrosion inhibition of two exemplary hydrophobically modified quaternized polysaccharides, corrosive fluids were prepared with 15% HCl, 0.5% hexamine, and 0.36% HII-124B™ (a corrosion inhibitor intensifier, available from Halliburton Energy Services, Inc.). The control sample was the corrosive fluid without a corrosion inhibitor, and the two test samples were the corrosive fluid with 2% by weight of Formula 1 or Formula 2.

After preparation of the control and test samples, a piece of steel grade P110 was placed in the samples and left for three hours at 225° F. (107° C.). Table 1 provides the corrosion loss of the steel based on mass measurements before and after exposure to the samples, where both of the exemplary hydrophobically modified quaternized polysaccharide corrosion inhibitors clearly mitigate corrosion of the steel.

TABLE 1

| Sample | Corrosion Loss (lb/ft$^2$) |
| --- | --- |
| Control | 0.115 |
| Formula 1 | 0.0408 |
| Formula 2 | 0.0455 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
contacting a metal surface with a treatment fluid that comprises an aqueous fluid, an inorganic acid, and a hydrophobically modified quaternized polysaccharide wherein the hydrophobically modified quaternized polysaccharide is Formula 1 where R1 is a $C_6$-$C_{32}$ alkyl group and R2 is a $C_6$-$C_{32}$ alkyl group,

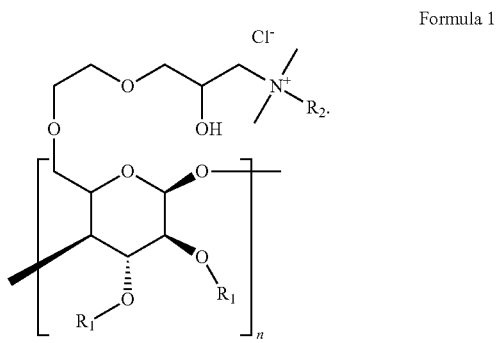

Formula 1 wherein the hydrophobically modified quaternized polysaccharide mitigates corrosion of the metal surface by the inorganic acid.

2. The method of claim 1, wherein the hydrophobically modified quaternized polysaccharide has a polysaccharide backbone with two pendant moieties: a hydrocarbon moiety and a quaternary ammonium-containing moiety, wherein the hydrocarbon moiety is a $C_6$-$C_{32}$ alkyl group.

3. The method of claim 2, wherein the quaternary ammonium-containing moiety is selected from the group consisting of propanamonium, N-cocoalkyl-N,N dimethyl, 2,3 dihydroxy; propanamonium, N-cocoalkyl-N,N diethyl, 2,3 dihydroxy; propanamonium, N-cocoalkyl-N,N dipropyl2,3 dihydroxy; propanamonium, N-cocoalkyl-N-methyl,N-ethyl2,3 dihydroxy; propanamonium, N-cocoalkyl-N-methyl,N-propyl2,3 dihydroxy; propanamonium, N-cocoalkyl-N-ethyl,N-propyl2,3 dihydroxy; propanamonium, N-soyalkyl-N,N dimethyl, 2,3 dihydroxy; propanamonium, N-soyalkyl-N,N diethyl, 2,3 dihydroxy; propanamonium, N-soyalkyl-N,N dipropyl2,3 dihydroxy; propanamonium, N-soyalkyl-N-methyl,N-ethyl2,3 dihydroxy; propanamonium, N-soyalkyl-N-methyl,N-propyl2,3 dihydroxy; propanamonium, N-soyalkyl-N-ethyl,N-propyl2,3 dihydroxy; ethanamonium, N-cocoalkyl-N,N diethyl 2 hydroxy; ethanamonium, N-cocoalkyl-N,N dimethyl 2 hydroxy; ethanamonium, N-cocoalkyl-N-methyl, N-ethyl 2 hydroxy; ethanamonium, N-cocoalkyl-N-methyl, N-propyl 2 hydroxy; ethanamonium, N-cocoalkyl-N-ethyl, N-propyl 2 hydroxy; ethanamonium, N-soyalkyl-N,N diethyl 2 hydroxy; ethanamonium, N-soyalkyl-N,N dimethyl 2 hydroxy; ethanamonium, N-soyalkyl-N-methyl, N-ethyl 2 hydroxy; ethanamonium, N-soyalkyl-N-methyl, N-propyl 2 hydroxy; and ethanamonium, N-soyalkyl-N-ethyl, N-propyl 2 hydroxy.

4. The method of claim 1, wherein the hydrophobically modified quaternized polysaccharide is Formula 2 where R1 is a $C_6$-$C_{32}$ alkyl group and R2 is a $C_6$-$C_{32}$ alkyl group

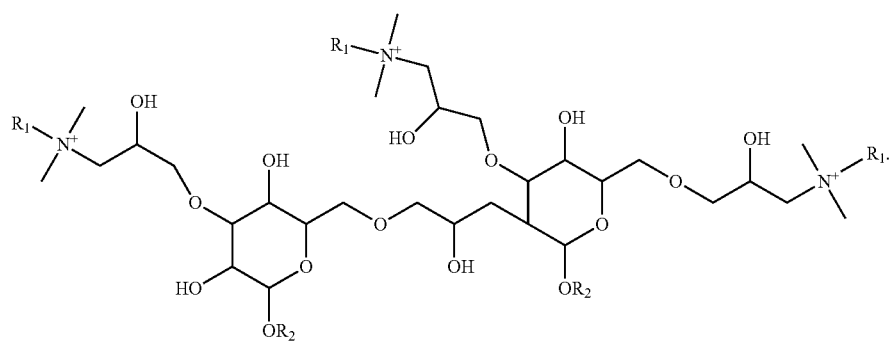

Formula 2

5. The method of claim 1 further comprising:
   introducing the treatment fluid into a wellbore penetrating a subterranean formation at or below a fracture pressure of the subterranean formation.
6. The method of claim 1 further comprising:
   introducing the treatment fluid into a wellbore penetrating a subterranean formation above a fracture pressure of the subterranean formation, thereby creating or extending at least one fracture in the subterranean formation.
7. The method of claim 1, wherein the inorganic acid is at about 1% to about 34% by weight of the treatment fluid.
8. The method of claim 1, wherein the hydrophobically modified quaternized polysaccharide is at about 0.05% to about 20% by weight of the treatment fluid.
9. The method of claim 1, wherein the treatment fluid further comprises a corrosion inhibitor intensifier.
10. The method of claim 9, wherein the corrosion inhibitor intensifier is at about 0.005% to about 40% by weight of the treatment fluid.

* * * * *